United States Patent [19]

Thiemann et al.

[11] Patent Number: 4,562,121
[45] Date of Patent: Dec. 31, 1985

[54] SOLDERING FOIL FOR STRESS-FREE JOINING OF CERAMIC BODIES TO METAL

[75] Inventors: Karl-Heinz Thiemann, Korb; Hans-Juergen Weinert, Wendlingen; Wilfried Räuchle, Wernau, all of Fed. Rep. of Germany

[73] Assignee: Daimler-Benz Aktiengesellschaft, Fed. Rep. of Germany

[21] Appl. No.: 681,635

[22] Filed: Dec. 14, 1984

[30] Foreign Application Priority Data

Dec. 14, 1983 [DE] Fed. Rep. of Germany ....... 3345219

[51] Int. Cl.$^4$ ...................... B23K 35/20; B23K 35/40
[52] U.S. Cl. ................................... 428/607; 428/671; 428/673; 228/56.3; 228/122; 228/263.12
[58] Field of Search ............... 428/607, 627, 671, 673, 428/660, 680, 681, 684, 926, 935, 939; 228/56.3, 198, 122, 124, 903, 263.12; 204/46 R; 427/431, 405

[56] References Cited

U.S. PATENT DOCUMENTS

| | | | |
|---|---|---|---|
| 625,117 | 5/1899 | Martin | 428/673 |
| 2,724,892 | 11/1955 | Knochel et al. | 228/124 |
| 3,107,756 | 10/1963 | Gallet | 428/671 |
| 3,454,374 | 7/1969 | Domin | 428/673 |
| 3,513,535 | 5/1970 | Clarke | 228/903 |
| 3,551,997 | 1/1971 | Etter | 228/124 |
| 3,675,311 | 7/1972 | Wells | 228/194 |
| 4,340,650 | 7/1982 | Pattanaik et al. | 228/563 |
| 4,448,853 | 5/1984 | Fischer et al. | 428/607 |

FOREIGN PATENT DOCUMENTS

| | | | |
|---|---|---|---|
| 131145 | 6/1978 | German Democratic Rep. | 228/124 |
| 28590 | 7/1972 | Japan | 228/122 |
| 1147522 | 4/1969 | United Kingdom | 428/671 |
| 682331 | 8/1979 | U.S.S.R. | 228/122 |

OTHER PUBLICATIONS

"High Temperature Metal Ceramic Seals", Harry Bender, Ceramic Age, Apr. 1954, pp. 15–47.
"Metal to Nonmetal Brazing", Pearsell et al., Research Laboratory of Electronics—MIT, Technical Report No. 104, Apr. 5, 1949.

*Primary Examiner*—L. Dewayne Rutledge
*Assistant Examiner*—John J. Zimmerman
*Attorney, Agent, or Firm*—Barnes & Thornburg

[57] ABSTRACT

A soldering foil having a multi-layer structure for the stress-free joining of ceramic bodies to metal is described along with a process for making the foil. The soldering foil contains two layers of an active solder, particularly a Cu/Ti solder, provided with an intermediate cushion layer, preferably of copper, which absorbs the stresses. Between the copper cushion layer and the active solder layers barrier layers of silver are arranged which are very thin in relation to the copper and solder layers. The soldering foil permits a low-stress and extremely durable connection to be established between metal and ceramic, simultaneously permitting relatively large deviations in the temperature and time parameters of the soldering process.

20 Claims, 2 Drawing Figures

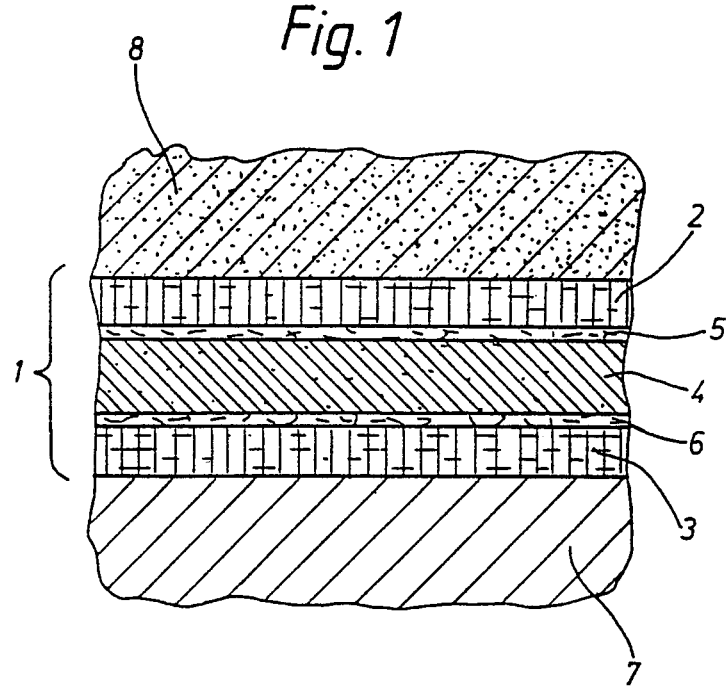
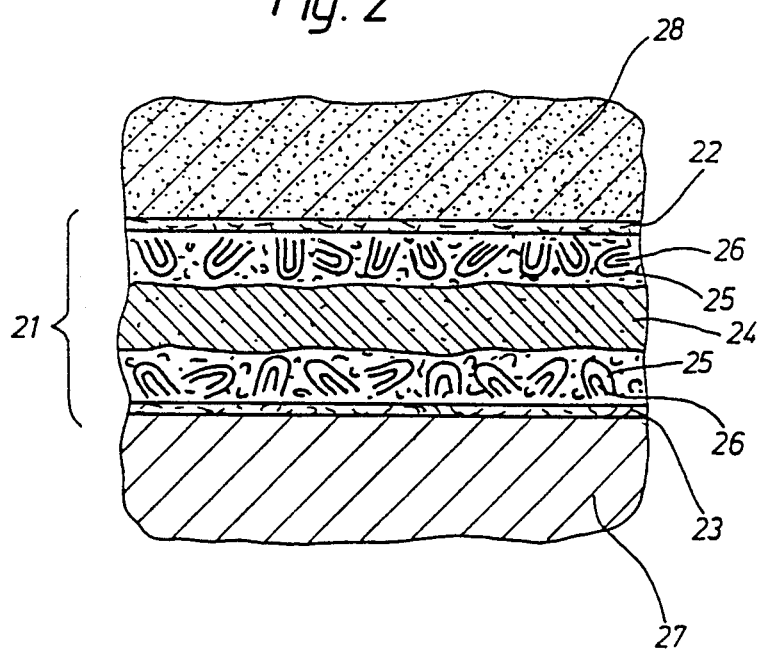

SOLDERING FOIL FOR STRESS-FREE JOINING OF CERAMIC BODIES TO METAL

BACKGROUND AND SUMMARY OF THE INVENTION

The invention generally relates to a soldering foil for the stress-free joining of ceramic bodies to metal, comprising two layers of an active solder provided with an intermediate cushion layer which absorbs stress. A process for manufacturing the subject foil is also disclosed.

To remove thermal stresses in solder layers, it is already known to use soldering foils which contain a cushion layer, for absorbing stress, between two solder layers (German Patent Application K 18,296/49h, (26/01), or Wiss. Z.d. Techn. Hochsch. Karl-Marx-Stadt, 10 (1968), No. 1, 83–89). Furthermore, a metal-ceramic component is known in which a layer of porous metal is inserted between two layers of active solder for absorbing stress (German Pat. No. 3,014,645).

However, the disadvantage in these joints or soldering foils is that, either the porous metal cushion layer is undesirably thick or thermal stresses are not reliably removed so that in some cases the soldering joints are weak. In addition, porous metal only permit small forces to be transmitted and there is also a danger that cavities existing in the porous metal will become filled with solder causing the entire compound structure to become brittle. When metal foils are used as the cushion layer, the soldering joints are extremely sensitive to fluctuations in the soldering process. Even slight fluctuations in the soldering temperature or the duration of soldering have a relatively large influence on the subsequent stability of the soldering joints.

Therefore, it is one object of the present invention to develop a soldering foil for joining ceramic to metal which leads to more solid soldering joints than hitherto obtainable.

Another object of the present invention is to develop a soldering foil which, during soldering, has a greater tolerance for deviations in soldering temperatures and soldering times than hitherto known soldering foils.

These and other objects are achieved by the multilayer soldering foils described herein.

The subject invention relates to a soldering foil having a multi-layer structure. The solder used in this arrangement is one which forms a chemical bond with ceramic at the soldering temperature (a so-called active solder). In this manner a particularly intimate connection between solder and ceramic material is achieved. In the case of oxide, nitride or carbide ceramics, titanium-containing active solders are normally used because the high affinity of titanium results in breakage of the oxide, nitride or carbide bonds of the ceramic surface, thereby producing a titanium oxide, nitride or carbide transition region with high adhesive strength. Titanium-containing active solders are known, for example, with a silver, silver/copper, silver/zirconium and copper base. Active solders with a copper base are particularly inexpensive. In these solders, the titanium content is between 20 and 43% by weight. A solder with a copper base with 22 to 28% by weight of titanium is particularly preferred. The active solder layer will typically be between 30 and 80 μm thick.

A cushion layer for absorbing stresses is placed between the two active solder outer layers of the soldering foil. This cushion layer can consist of, for example, copper, iron, nickel, iron-nickel alloy, copper-beryllium alloy or low-carbon steel. Because of its high ductility, a copper foil is preferred in this arrangement. The thickness of the copper foil is normally matched to the magnitude of the natural stress to be compensated. The cushion layer usually has a thickness of from 50 to 300 μm.

A barrier layer of silver is arranged between the cushion layer which compensates for stresses and each active solder layer. This barrier layer is essential for the durability of the soldering joints and desirable behaviour of the soldering foil during the soldering process. The silver layer can be extremely thin with a thickness normally between 2 and 10 μm. The barrier layer can be produced by various processes, such as, for example, by electrolytic coating of the copper foil or of the active solder layer, by inserting a silver foil between the active solder layer and the cushion layer or, also by sprinkling a layer of silver powder onto the cushion layer before joining the cushion layer to the active solder layer.

Further objects, advantages and novel features of the present invention will become more apparent from the following detailed description when considered in conjunction with the accompanying drawings which show, for purpose of illustration only, embodiments in accordance with the present invention.

BRIEF DESCRIPTION OF THE DRAWINGS

FIG. 1 shows a cross sectional view of a soldering foil inserted between an iron and a ceramic substrate before soldering; FIG. 2 shows the soldering joint after soldering.

DETAILED DESCRIPTION OF THE DRAWINGS

Referring to FIG. 1, the soldering foil 1 is shown between a ceramic layer 8 and a steel base 7. The soldering foil contains two outer layers 2, 3 of an active copper-titanium solder containing about 26% by weight of titanium, each having a thickness of about 50 μm. A cushion layer 4 of copper, which absorbs stresses, has a thickness of about 100 μm. The copper layer 4 is electrolytically coated on both sides with a the barrier layers 5 and 6 of silver. The silver layer has a thickness of about 2 to 3 μm.

The soldering process takes place, for example, by inductive heating or electric resistance heating with a rate of heating of approximately 200° C./min. in vacuo. It is further anticipated that soldering may be performed by heating under inert gas. As soon as a soldering temperature of about 870 to 890° C. (depending on the silver content) has been reached, the solder is held for a few seconds at the soldering temperature and then cooled at a rate of about 50° C./min.

After cooling, the soldering joint has a structure as shown in FIG. 2. The solder layer 21 is located between the ceramic base 28 and the steel base 27. In this solder layer, a multi-layer structure can be seen. Directly adjoining each base 27 and 28 are two thin layers 22 and 23 which represent transition layers between the solder and the substrate in the joint. In the center between the ceramic substrate and the steel substrate is the copper layer 24 the thickness of which, however, being noticeably decreased. This copper layer performs the dual function of removing thermally caused natural stresses in the soldering joint and preventing the brittle Ti-rich intermetallic phases 26 from dispersing through the entire soldering joint. The silver from the barrier layer has surrounded the brittle Ti-rich intermediate phases 26 as borders 25. The silver borders prevent the intermetallic phases 26 from merging so that they remain fine-grained and thus preventing the entire soldering joint from becoming brittle. Simultaneously, the ductible silver border also contributes to removing the natural stresses in the soldering joint. During the soldering process, the silver barrier layer impedes the diffusion of copper into the active solder layer, thereby preventing undesirable titanium dilution in the active solder layer and a consequent increase in melting point. In addition, a diffusion of Ti from the active solder layer into the Cu foil is prevented, thereby eliminating precipitation hardening of the Cu of the Cu foil.

A special advantage of the soldering foil is the creation of a largely stress-free joint between ceramic and metal which is extremely durable. Another advantage is that during a soldering process employing the soldering foil, relatively large deviations in temperature and time parameters of the soldering process can be tolerated.

EXAMPLE

A silver layer with a thickness of 2 mm was electrolytically applied to both sides of a copper foil having a thickness of 100 mm. Using a melt extrusion method, the silver-plated copper foil was then provided on both sides with an active solder layer of a copper-titanium alloy having a titanium content of 26% by weight. The thickness of the active solder layer on each side was 50 mm.

The soldering foil produced in this manner was placed between a steel body with a thickness of 20 m and a ceramic wafer with a thickness of 4 mm. By inductive heating, the solder and steel wafer were brought to the soldering temperature at 890° C. at a rate of approximately 200° C./min. in vacuo. This temperature was held for approximately 2 min. after which the soldering joint was cooled at a rate of about 50° C./min.

The strength of the soldering joint was determined with shearing tests in which a shearing load was applied to the soldering joint until the ceramic sheared. The mean strength was 150 N/mm$^2$.

From the preceding description of the preferred embodiments, it is evident that the objects of the invention are attained, and although the invention has been described and illustrated in detail it is to be clearly understood that the same is by way of illustration and example only and is not be taken by way of limitation. The spirit and scope of the invention are to be limited only by the terms of the appended claims.

We claim:
1. A soldering foil comprising:
a cushion layer of a material selected from the group consisting of copper, iron, nickel, a copper-beryllium alloy, a nickel-iron alloy and low carbon steel,
a silver barrier layer adjacent each side of said central cushion layer, and
an active solder layer adjacent each said silver barrier layer.

2. A soldering foil according to claim 1, wherein said active solder layer contains titanium.

3. A soldering foil according to claim 2, wherein said active solder layer contains copper.

4. A soldering foil according to claim 3, wherein said active solder layer has a titanium content of from 20 to 43% by weight.

5. A soldering foil according to claim 3, wherein said active solder layer has a titanium content of from 22 to 28% of weight.

6. A soldering foil according to claim 1, wherein said cushion layer has a thickness of about 50 to 300 μm 7. A soldering foil according to claim 6, wherein said active solder layer has a thickness of about 30 to 80 μm.

8. A soldering foil according to claim 7, wherein said barrier layer has a thickness of about 2 to 10 μm.

9. A soldering foil comprising:
a cushion layer containing copper,
a silver barrier layer adjacent each side of said central cushion layer, and
an active solder layer adjacent each said silver barrier layer.

10. A soldering foil according to claim 9, wherein said active solder layer contains titanium.

11. A soldering foil according to claim 10, wherein said active solder layer contains copper.

12. A soldering soil according to claim 10, wherein said active solder layer has a thickness of 30 to 80 μm, said cushion layer has a thickness of from 50 to 300 μm and said silver barrier layer has a thickness of from 2 to 10 μm.

13. A soldering foil according to claim 2, wherein said barrier layer is electrolytically deposited on said cushion layer.

14. A process for making a soldering foil comprising:
depositing a layer of silver onto each side of a foil layer selected from the group consisting of copper, iron, nickel, copper-beryllium alloy and nickel-iron alloy, and
depositing a layer of titanium alloy onto each said layer of silver.

15. A process according to claim 14, wherein each said layer of silver is electrolytically deposited.

16. A process according to claim 15, wherein each said layer of titanium alloy is deposited by melt-extrusion of said titanium alloy.

17. A process according to claim 16, wherein said titanium alloy contains about 20 to 43% titanium by weight.

18. A process according to claim 17, wherein said foil layer has a thickness of about 50 to 300 μm.

19. A process according to claim 14, wherein each said layer of silver is between 2 and 10 μm thick.

20. A process according to claim 16, wherein said layer of titanium alloy is between 30 and 80 μm thick.

* * * * *